US012049852B1

(12) United States Patent
Echague et al.

(10) Patent No.: US 12,049,852 B1
(45) Date of Patent: Jul. 30, 2024

(54) HETEROGENEOUS FUEL INJECTOR DRIVER TOPOLOGIES

(71) Applicant: Cummins Inc., Columbus, IN (US)

(72) Inventors: Roland Echague, Mahtomedi, MN (US); Viren Vilassinha Pardeshi, Aurangabad (IN); Sarang Gupta, Nagpur (IN); Ruchir Shah, Columbus, IN (US); Harshada Chaitanya Suryawanshi, Pune (IN)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/501,164

(22) Filed: Nov. 3, 2023

(51) Int. Cl.
*F02D 41/30* (2006.01)
*F02D 41/26* (2006.01)

(52) U.S. Cl.
CPC ......... *F02D 41/3094* (2013.01); *F02D 41/26* (2013.01); *F02D 41/3005* (2013.01)

(58) Field of Classification Search
CPC ... F02D 41/3094; F02D 41/26; F02D 41/3005
See application file for complete search history.

(56) References Cited

U.S. PATENT DOCUMENTS 5,233,964 A 8/1993 Jamoua et al.
5,829,412 A 11/1998 Klatt et al.
9,382,842 B2 * 7/2016 Carter ..................... F02B 37/12
9,541,022 B2 * 1/2017 Hoban, Jr. ............ F02P 5/1502
9,845,777 B2 * 12/2017 Meyer .............. H03K 19/17788
10,208,686 B1 * 2/2019 Thomas .............. F02D 41/2477
10,229,778 B2 * 3/2019 Etzler ..................... H01F 7/064
10,599,875 B2 * 3/2020 Bathurst ................ G06F 21/75
10,746,120 B2 * 8/2020 Dian .................... F02M 57/005
2006/0227487 A1 10/2006 Cutter et al.
2006/0275970 A1 12/2006 Nadd et al.
2014/0121946 A1 5/2014 Viele (Continued)

OTHER PUBLICATIONS

"LM1949 Injector Drive Controller", National Semiconductor, Feb. 1995, 12 pgs., also available at http://data.leocom.kr/datasheets/62096_37031.

(Continued)

*Primary Examiner* — Joseph J Dallo
(74) *Attorney, Agent, or Firm* — Taft, Stettinius & Hollister LLP

(57) ABSTRACT

An apparatus includes a housing containing a microcontroller and injector driver circuitry including a first integrated circuit operatively coupled with and controllable by the microcontroller, a first plurality of switching devices operatively coupled with and controllable by the first integrated circuit, second injector driver circuitry including a second integrated circuit operatively coupled with and controllable by the microcontroller and a second plurality of switching devices operatively coupled with and controllable by the second integrated circuit and third injector driver circuitry comprising a third integrated circuit operatively coupled with and controllable by the microcontroller and a third plurality of switching devices operatively coupled with and controllable by the third integrated circuit. Each of the first, second, and third pluralities of switching devices includes a set of switches configured to drive a respective bank of multiple boosted injectors one or more sets of switches configured to drive a respective single unboosted injector.

20 Claims, 9 Drawing Sheets

(56) References Cited

U.S. PATENT DOCUMENTS

| | | | | |
|---|---|---|---|---|
| 2015/0303805 | A1 | 10/2015 | Franchini et al. | |
| 2016/0177855 | A1 | 6/2016 | Kusakabe et al. | |
| 2016/0246664 | A1 | 8/2016 | Pickel et al. | |
| 2017/0138292 | A1 | 5/2017 | Schweikert et al. | |
| 2017/0292898 | A1 | 10/2017 | Schweiker et al. | |
| 2017/0358387 | A1 | 12/2017 | Etzler | |
| 2018/0142643 | A1 | 5/2018 | Fukuda | |
| 2021/0156330 | A1 | 5/2021 | Giri et al. | |
| 2021/0245756 | A1 * | 8/2021 | Martin | F02D 41/123 |

OTHER PUBLICATIONS

"NCV7601 Quad Driver", Semiconductor Components Industries, LLC, Oct. 2007, 7 pgs. also available at www.onsemi.com/pdf/datasheet/ncv7601-d.pdf.

"Automotive 4 Channel Valve Driver", Life.Augmented DataSheet "Automotive 4 Channel Valve Driver", Nov. 2021, 107 pgs., also available at www.st.com/resource/en/datasheet/I9305.pdf.

"MC33PT2001 Programmable solenoid controller", "MC33PT2001 Programmable solenoid controller", Product Short Data Sheet, Feb. 15, 2023, 20 pgs., also available at www.nxp.com/docs/en/data-sheet/MC33PT2001_SDS.pdf.

"MTL4525—MTL5525 Solenoid/Alarm Driver switch operated with override, IIC, low power", Easton Electric Limited "MTL4525-MTL5525 Solenoid/Alarm Driver Switch Operated with Override, LLC, Low Power", Jan. 2017, 1 pg., also available at www.mtl-inst.com/images/uploads/datasheets/MTLx525.pdf.

"PWM Low-Side Driver (1.5A and 3A) for Solenoids, Coils, Valves, Heaters, and Lamps", Burr-Brown Products from Texas Instruments "PWM Low-Side Driver (1.5A and 3A) for Solenoids, Coils, Valves, Heaters, and Lamps", Jun. 2001, 27 pgs.

* cited by examiner

HETEROGENEOUS FUEL INJECTOR DRIVER TOPOLOGIES

TECHNICAL FIELD

The present disclosure relates to heterogeneous fuel injector driver topologies and electronics and related apparatuses, processes, systems, and topologies.

BACKGROUND

Fuel injector electronics are useful for enabling computerized control over fuel injectors of internal combustion engine fuel systems. Fuel injector electronics may include driver circuitry configured to receive input in the form of control signals from a microcontroller and to provide output in the form of voltages and currents effective to ultimately operate a plurality of fuel injectors. A number of proposals for fuel injector electronics have been made; however, such approaches suffer from a number of disadvantages, drawbacks, and shortcomings including those respecting flexibility, form factor, input/output (i/o) pin consumption, packaging, and combinations thereof, among other problems. There remains a significant need for the unique apparatuses, processes, systems, and topologies, disclosed herein below.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

SUMMARY

One embodiment is an apparatus comprising unique fuel injector electronics. Another embodiment is a process involving unique fuel injector electronics. A further embodiment is a system comprising unique fuel injector electronics. Further embodiments, forms, objects, features, advantages, aspects, and benefits shall become apparent from the following description and drawings.

DETAILED DESCRIPTION OF EXAMPLE EMBODIMENTS

Figure 1:
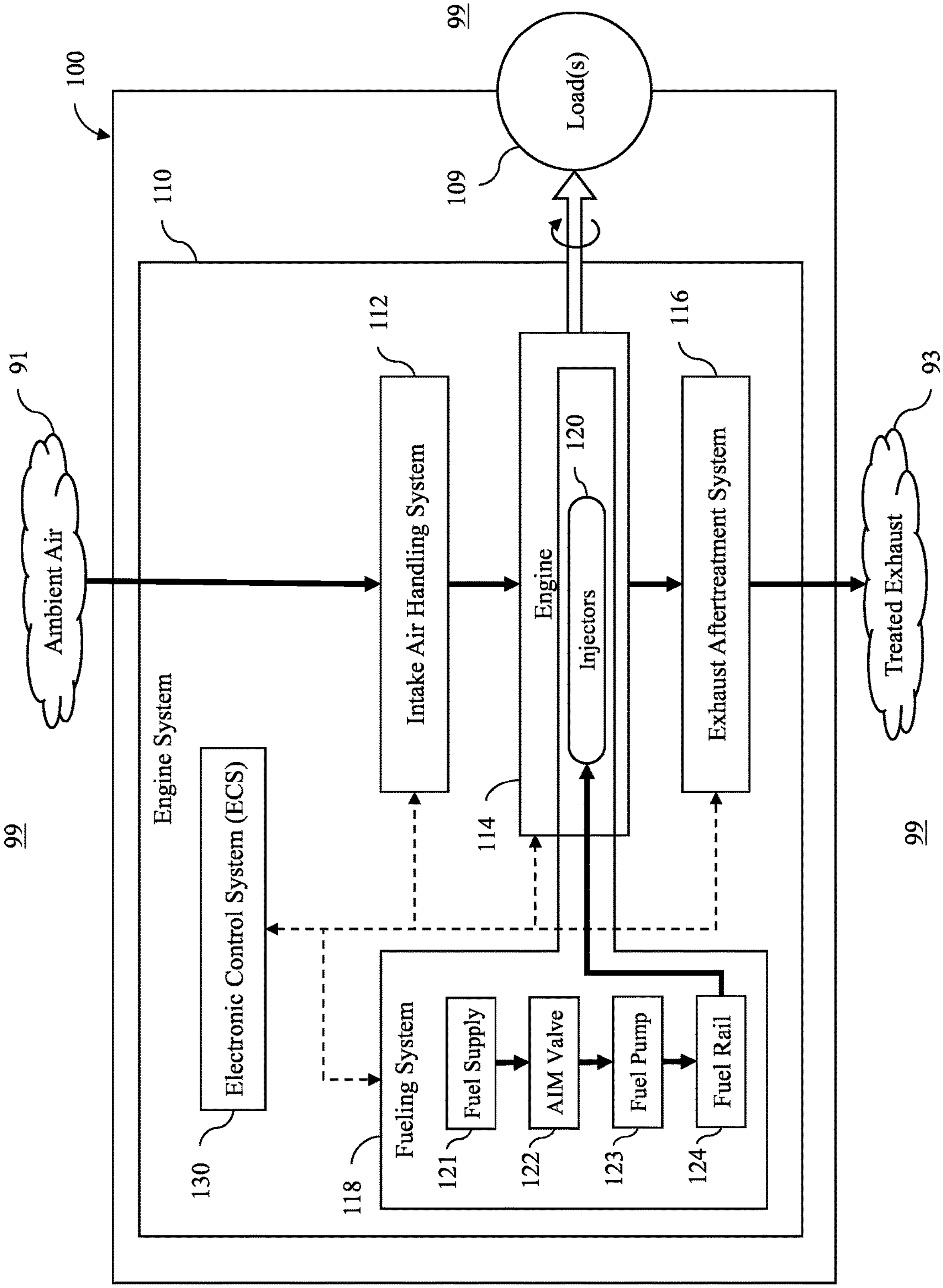
FIG. 1 is a schematic diagram depicting certain aspects of an example internal combustion engine system in an example operating environment.

With reference to FIG. 1, there is illustrated an example system 100 including an internal combustion engine system 110 (also referred to herein as engine system 110) and at least a portion of one or more loads 109. System 100 may be provide in a number of forms including, for example, in the form of a vehicle or vehicle powertrain system (e.g., an on-highway vehicle or vehicle powertrain system or an off-highway vehicle or vehicle powertrain system), a work machine or work machine powertrain system, a genset or genset powertrain system, or a hydraulic fracturing rig or hydraulic fracturing rig powertrain system, to name several non-limiting examples. In shall be appreciated that system 100 may include a number of other components as will occur to one of skill in the art with the benefit and insight of the present disclosure.

In the illustrated example, engine system 110 includes an intake air handling system 112, an engine 114, an exhaust aftertreatment system 116, a fueling system 118, and an electronic control system (ECS) 130. It shall be appreciated that system 110 may include a number of other components as will occur to one of skill in the art with the benefit and insight of the present disclosure.

Intake air handling system 112 may include one or more air handling conduits, air filters, compressors (such as a compressor of a turbocharger or supercharger), coolers (such as charger air coolers, intercoolers, and/or aftercoolers which may be, for example, of an air-to-air type or an air-to-liquid type), and sensors (such as temperature sensors, pressure sensors, mass flow sensors, and other types of sensors), as well as other components.

Engine 114 may be provided in a number of forms and typically includes a block including a plurality of cylinders and a head coupled with the block. The head typically includes intake ports, intake valves configured to selectively open and close the intake ports, exhaust ports, exhaust valves configured to selectively open and close the exhaust ports, injector bores, fuel injectors disposed in the injector bores, spark plug bores, and spark plugs disposed in the spark plug bores. A plurality of pistons may be provided in respective ones of the plurality of cylinders. A crankshaft may be coupled with the plurality of pistons and configured to translate reciprocating motion of the plurality of pistons to provide torque for driving loads 109 which may include internal loads of system 110 (such oil pumps, valvetrains, fuel pumps and other loads of engine 114, and accessory loads of system 110). It shall be appreciated that system 110 may include a number of other components as will occur to one of skill in the art with the benefit and insight of the present disclosure.

Exhaust system 116 may include one or more exhaust handling conduits, turbines (such as a turbine of a turbocharger), aftertreatment components (such as oxidation catalysts, particular filters, selective catalytic reduction (SCR) catalysts, and/or other catalysts and aftertreatment components), and sensors (such as temperature sensors, pressure sensors, oxygen or lambda sensors, mass flow sensors, and other types of sensors), as well as other components.

Fueling system 118 may be configured and provided as a high-pressure common-rail fuel injection system including a fuel supply 121 configured and operable to supply fuel to a high pressure fuel pump 123 via an active inlet metering (AIM) valve 122 which is actively controlled by ECS 130 as further described herein below. The fuel supply 121 may include a low-pressure fuel circuit including a booster pump, which may be immersed in a tank containing a reservoir of fuel. The high pressure fuel pump 123 is configured and operable to supply pressurized fuel to a high pressure common fuel rail 124 which, in turn, is configured and operable to supply pressurized fuel to a plurality of fuel injectors 120.

ECS 130 preferably includes one or more programmable microcontrollers of a solid-state, integrated circuit type, and one or more non-transitory memory media configured to store instructions executable by the one or more microcontrollers. For purposes of the present application the term microcontroller shall be understood to also encompass microprocessors, system on chip (SOC) type integrated circuits, and other types of integrated circuit processors. ECS 130 is in operative communication with and may be adapted and configured to control operation of and/or receive inputs from sensors or controllers of intake air handling system 112, engine 114, exhaust system 116, and fueling system 118. It shall be appreciated that FIG. 1 depicts control relationships between the foregoing components conceptually using dashed arrows and that various communications hardware and protocols may be utilized to implement, such as one or more controller area networks (CAN) or other communications components.

ECS 130 can be implemented in any of a number of ways that combine or distribute the control function across one or more control units in various manners. The ECS 130 may execute operating logic that defines various control, management, and/or regulation functions. This operating logic may be in the form of dedicated hardware, such as a hardwired state machine, analog calculating machine, programming instructions, and/or a different form as would occur to those skilled in the art. The ECS 130 may be provided as a single component or a collection of operatively coupled components; and may be comprised of digital circuitry, analog circuitry, or a hybrid combination of both of these types. When of a multi-component form, the ECS 130 may have one or more components remotely located relative to the others in a distributed arrangement. The ECS 130 can include multiple processing units arranged to operate independently, in a pipeline processing arrangement, in a parallel processing arrangement, or the like. It shall be further appreciated that the ECS 130 and/or any of its constituent components may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or components as would occur to those skilled in the art to perform the desired communications.

An operating environment 99 is also depicted in FIG. 1. As described above, during typical operation of system 100, ambient air 91 of operating environment 99 is received as an input to system 100, and treated exhaust 93 from system 100 is released to operating environment 99. In some embodiments, loads 109 may at least in part comprise a portion of operating environment 99. For example, in embodiments where system 100 is provided in the form of a genset or genset powertrain system, the one or more loads 109 may comprise loads at various nodes in a distributed power network in addition to load components which, even if small, are integral to system 100. As another example, in embodiments where system 100 is provided in the form of a vehicle or vehicle powertrain system, loads 109 may include forces such as wind, gravity, road surface friction and other environmental load components in addition to load components which, even if small, are integral to system 100.

Figure 2:
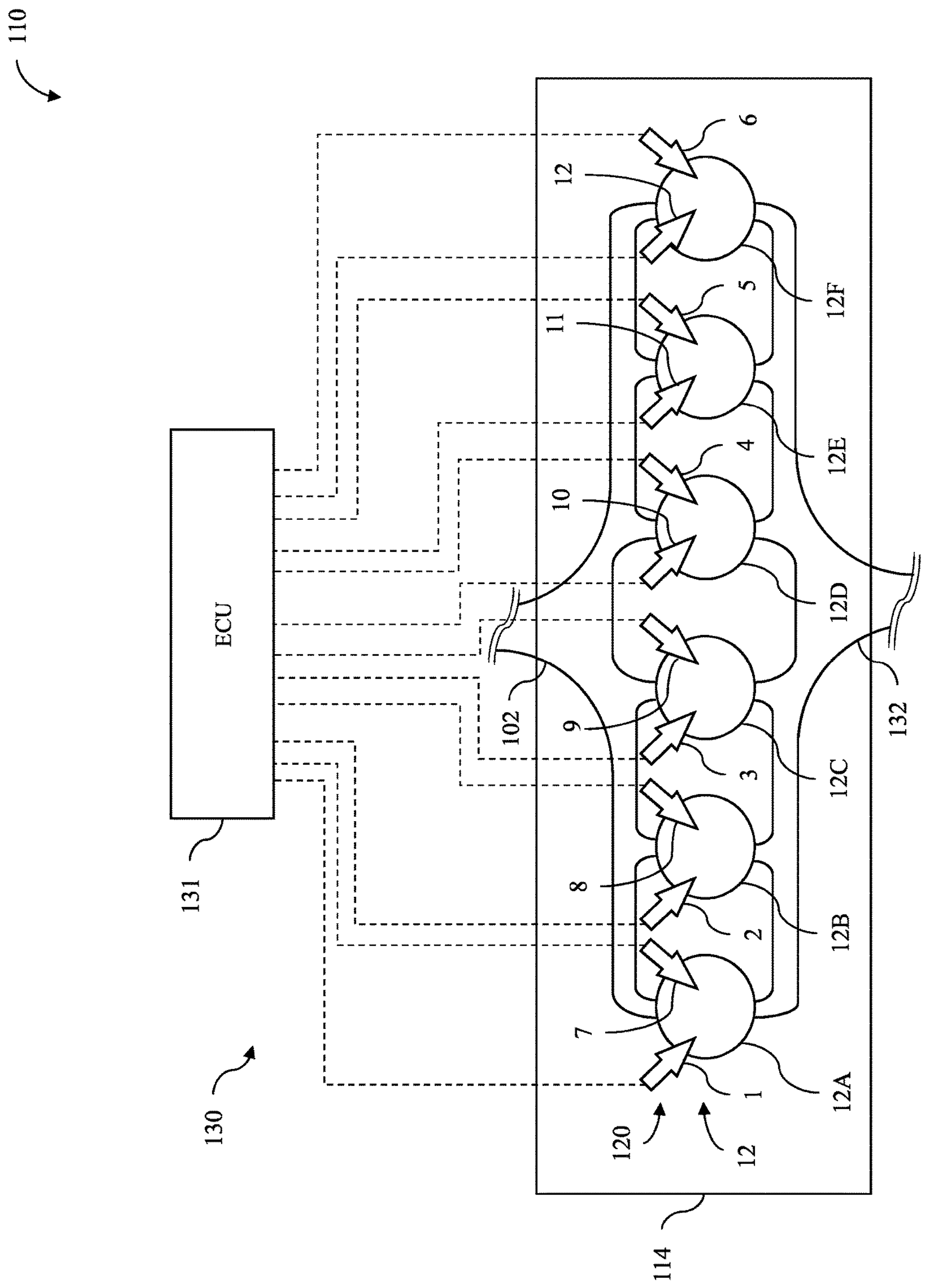
FIG. 2 is a schematic diagram depicting certain aspects of the example internal combustion engine system of FIG. 1.

With reference to FIG. 2, there are illustrated certain aspects of an example implementation of system 110. In the illustrated example, ECS 130 comprises an electronic control unit (ECU) 131 which is in operative communication with and configured to supply control signals to and received feedback signals from a plurality of fuel injectors 120 which are operatively coupled with and are configured to inject fuel into respective cylinders 12 of engine 114. In the illustrated example, the plurality of injectors 120 are configured and provided as direct injectors which inject fuel directly into cylinders 12. In other embodiments, one or more of the injectors may be configured and provided as a port injector which inject fuel into respective intake ports leading from intake manifold 102 into respective cylinders 12. Cylinders 12 are also operatively coupled with an exhaust manifold 132.

In the illustrated embodiment, each of cylinders 12 is provided with fuel from two of fuel injectors 120. Injector 1 and injector 7 are configured and operable to provide fuel to cylinder 12A. Injector 2 and injector 8 are configured and operable to provide fuel to cylinder 12B. Injector 3 and injector 9 are configured and operable to provide fuel to cylinder 12C. Injector 4 and injector 0 are configured and operable to provide fuel to cylinder 12D. Injector 5 and injector 11 are configured and operable to provide fuel to cylinder 12E. Injector 6 and injector 12 are configured and operable to provide fuel to cylinder 12F. The pairs of injectors servicing each of cylinders 12 may comprise one unboosted injector driven by an unboosted voltage and one boosted injector driven by a boosted voltage greater than the unboosted voltage. Injectors 7, 8, 9, 10, 11, and 12 may be configured and provided as single, unbanked unboosted injectors. Injectors 1, 2, 3, 4, 5, and 6 may be configured and provided as boosted injectors and may be provided in a plurality of injector banks. Injectors 1 and 2 may be configured and provided as a first boosted bank of injectors. Injectors 3 and 4 may be configured and provided as a second boosted bank of injectors. Injectors 5 and 6 may be configured and provided as a third boosted bank of injectors.

Figure 3:
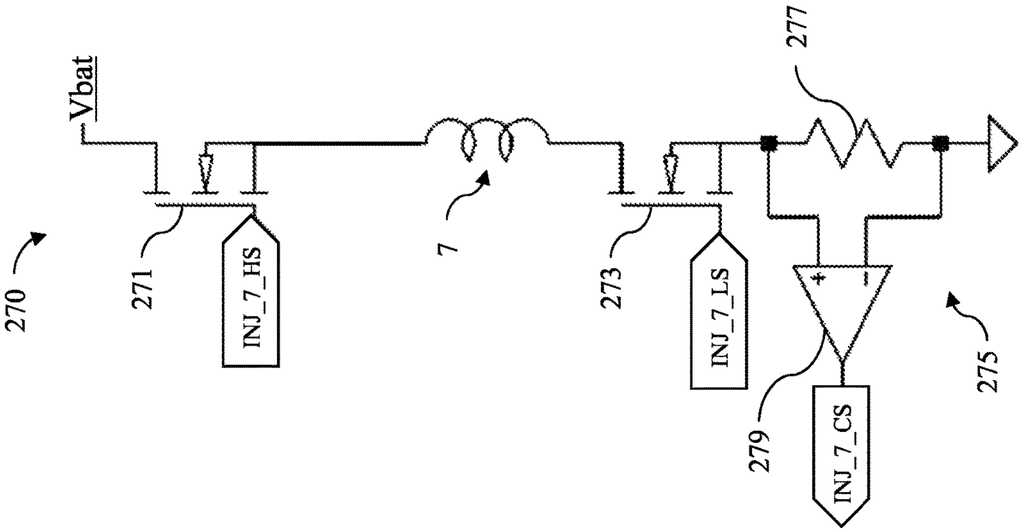
FIG. 3 is a schematic diagram depicting certain aspects of an example fuel injector circuit.

With reference to FIG. 3, there is illustrated an example circuit 270 for actuating injector 7 which is provided and configured in the form of a single unboosted injector. Circuit 270 includes a high side switch 271 and a low side switch 273 which are each configured and provided in the form of a power MOSFET. In other embodiments, high side switch 271 and low side switch 273 may be configured and provided as another type of switch in other embodiments such, for example, as an IGBT or another type of switching device.

The source terminal of high side switch 271 is operatively coupled with injector 7. The drain terminal of high side switch 271 is operatively coupled with an unboosted voltage source (Vbat). The gate terminal of high side switch 271 is operatively coupled with high side switch control signal (INJ_7_HS).

The drain terminal of low side switch 273 is operatively coupled with injector 7. The source terminal of low side switch 273 is operatively coupled with current sensor 275. The gate terminal of low side switch 273 is operatively coupled with low side switch control signal (INJ_7_LS).

Current sensor 275 includes a shunt resistor 277 which is operatively coupled with low side switch 273 and with ground. Current sensor 275 includes a comparator 279 with inputs that are coupled across shunt resistor 277 at respective nodes. The output of current sensor 275 is provided as current sensor signal (INJ_7_CS).

High side switch 271 and low side switch 273 may be controlled by control signal (INJ_7_HS) and control signal (INJ_7_LS), respectively, to selectably cause current to flow through injector 7 effective to actuate injector 7. The current flowing through injector 7 may be detected by current sensor 275 and provided as feedback in the form of a current sensor signal (INJ_7_CS).

It shall be appreciated that circuits substantially similar circuit 270 may be provided and utilized in connection with injector 8, injector 9, injector 10, injector 11, and injector 12. Such substantially similar circuits may receive control inputs and provide feedback outputs analogous to those of circuit 270, but configured for control and sensing of injector 8, injector 9, injector 10, injector 11, and injector 12, for example, as described in connection with FIGS. 6A, 6B, and 6C.

It shall be appreciated that circuits substantially similar circuit 270 may be provided and utilized in connection with the single injectors. As illustrated in FIG. 6B, circuit 270' may be provided for injector 8, circuit 270" may be provided for injector 10, and circuit 270''' may be provided for the AIM valve. Such circuits may be substantially similar to circuit 270 but with inputs and outputs corresponding to injector 8, injector 10, and the AIM valve. Circuit 270' may receive control inputs and provide feedback outputs analogous to those of circuit 270, but configured for control and sensing of injector 8. Circuit 270" may receive control inputs and provide feedback outputs analogous to those of circuit 270, but configured for control and sensing of injector 10. Circuit 270''' may receive control inputs and provide feedback outputs analogous to those of circuit 270, but configured for control and sensing the AIM valve.

Figure 6A:
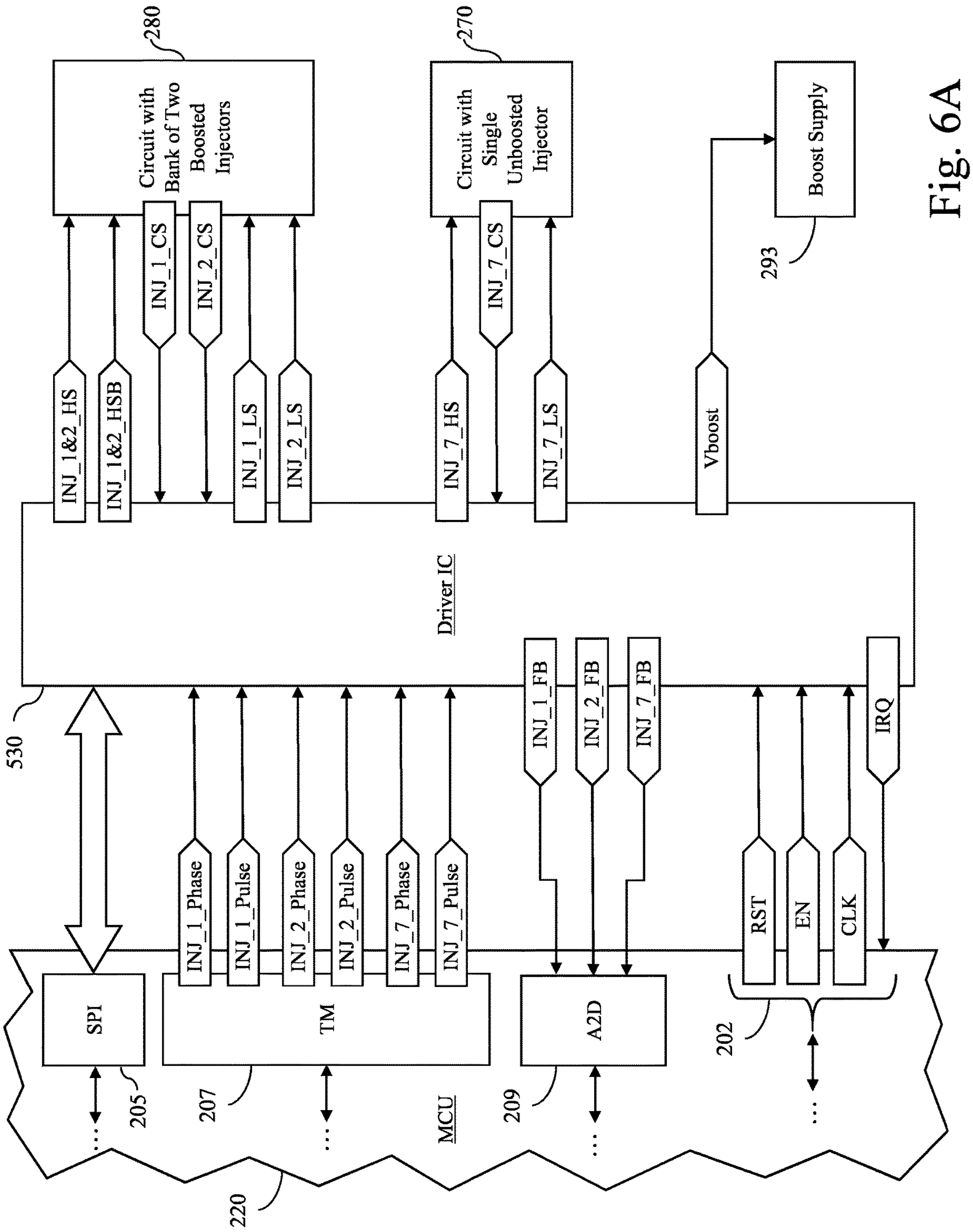
FIGS. 6A, 6B, and 6C are schematic diagrams depicting certain aspects of the fuel injector controller of FIG. 5.
Figure 6B:
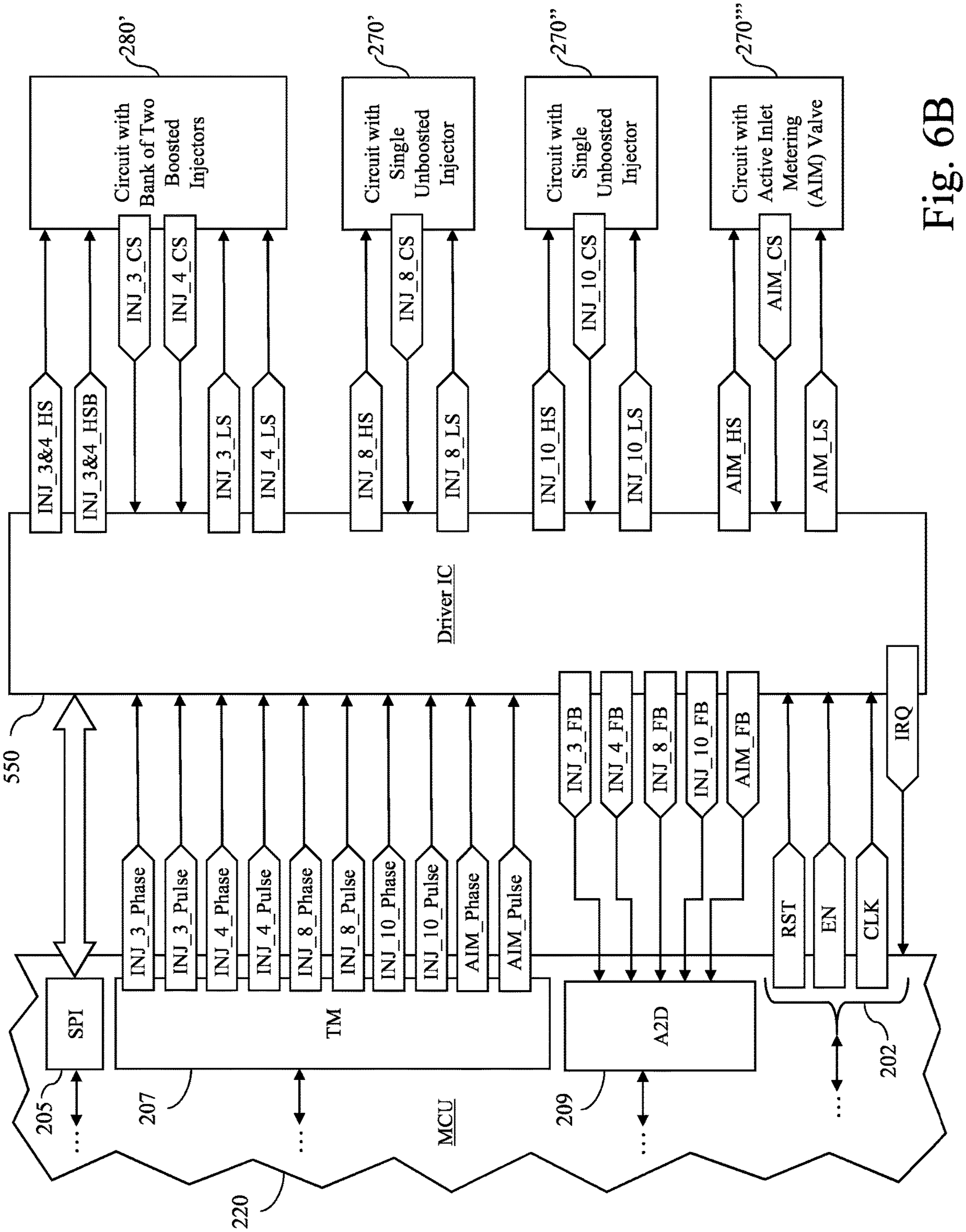
Figure 6C:
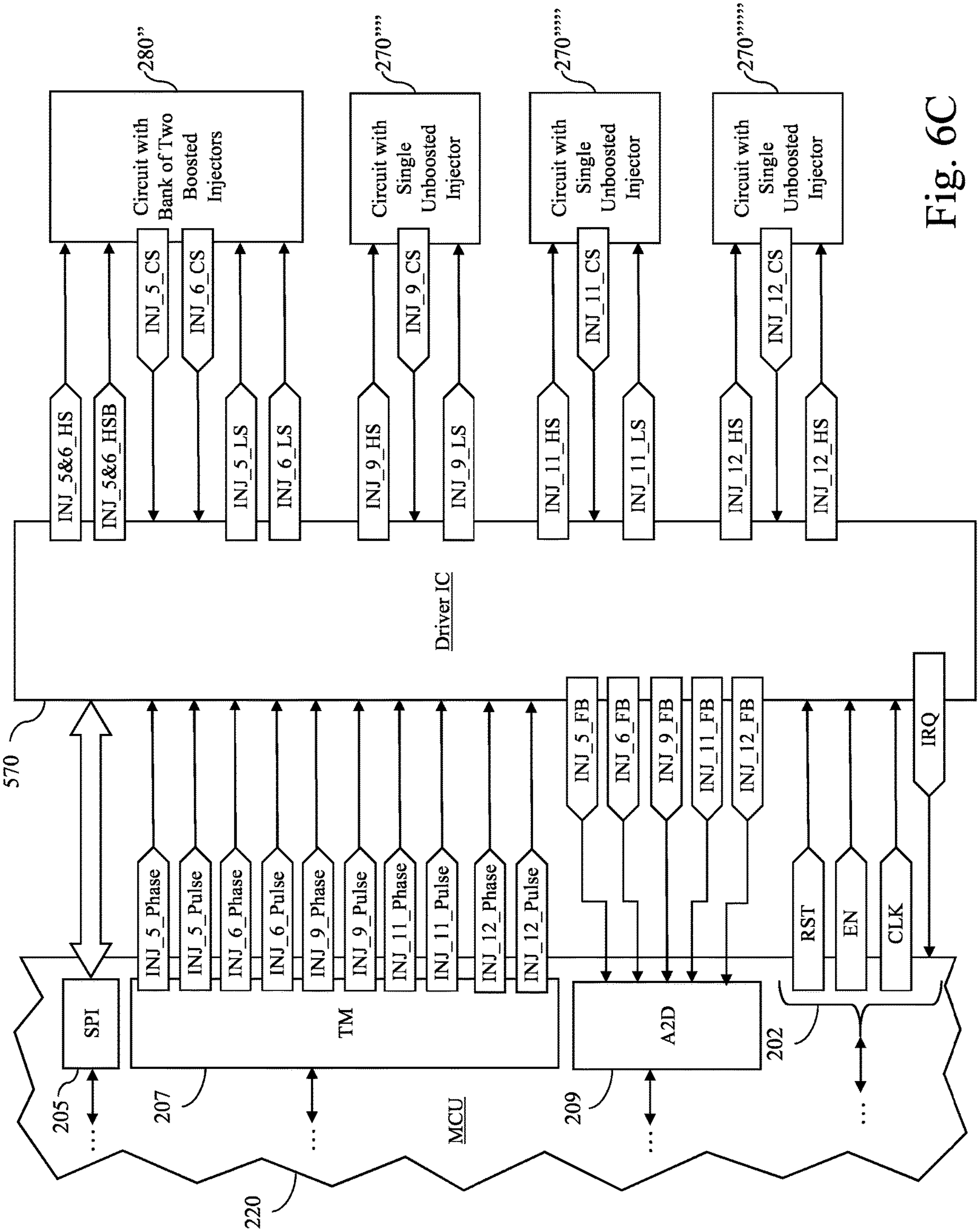

As illustrated in FIG. 6C, circuit 270'''' may be provided for injector 9, circuit 270''''' may be provided for injector 11, and circuit 270'''''' may be provided for the injector 12. Such circuits may be substantially similar to circuit 270 but with inputs and outputs corresponding to injector 89, injector 11, and injector 12. Circuit 270'''' may receive control inputs and provide feedback outputs analogous to those of circuit 270, but configured for control and sensing of injector 9. Circuit 270''''' may receive control inputs and provide feedback outputs analogous to those of circuit 270, but configured for control and sensing of injector 11. Circuit 270''''' may receive control inputs and provide feedback outputs analogous to those of circuit 270, but configured for control and sensing of injector 12.

Figure 4:
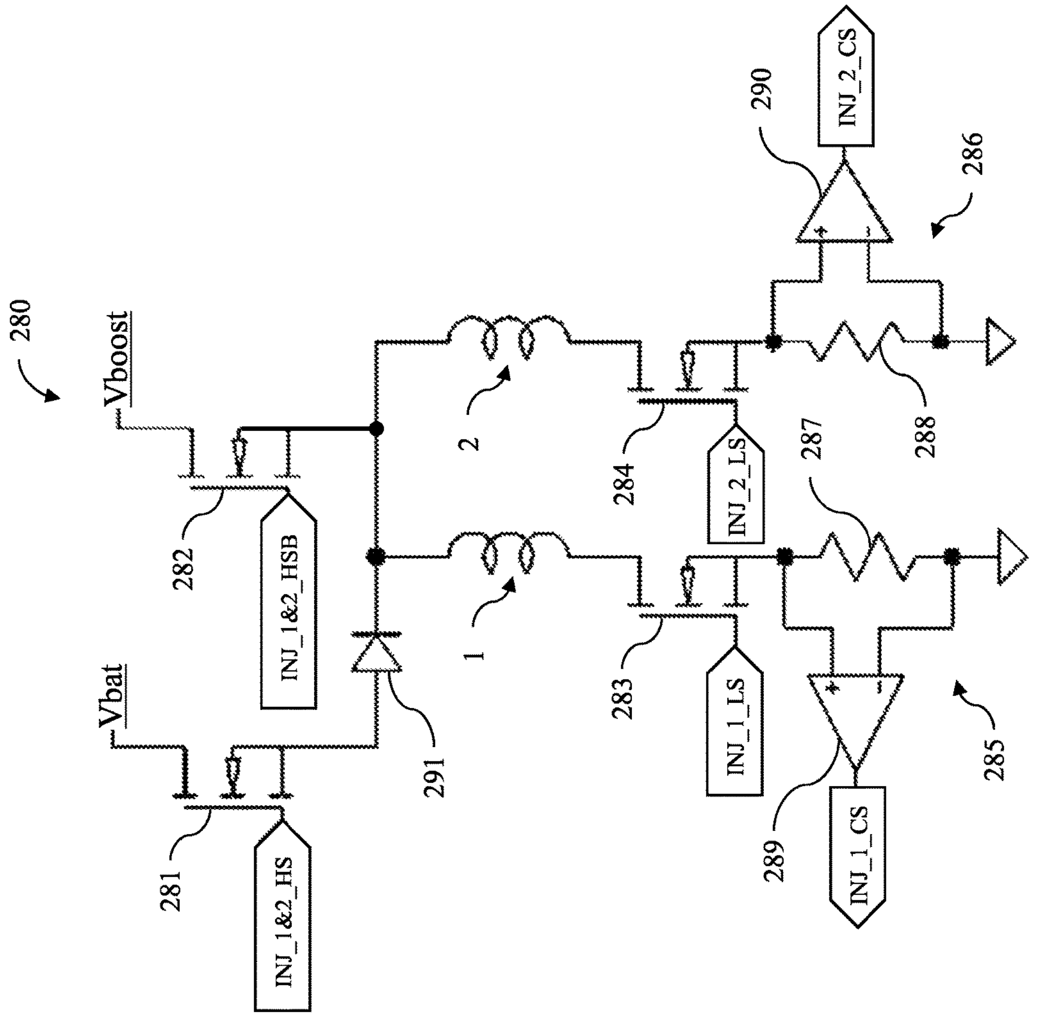
FIG. 4 is a schematic diagram depicting certain aspects of an example fuel injector circuit.

With reference to FIG. 4, there is illustrated an example circuit 280 for actuating injector 1 and injector 2 which are provided and configured in the form of a boosted bank of injectors. Circuit 280 includes high side switch 281, high side switch 282, low side switch 283, and low side switch 284 which are each configured and provided in the form of a power MOSFET. In other embodiments, high side switch 281, high side switch 282, low side switch 283, and low side switch 284 may be configured and provided as another type of switch in other embodiments such, for example, as an IGBT or another type of switching device.

The source terminal of high side switch 281 is operatively coupled with injector 1 and injector 2 via reverse blocking diode 291. The drain terminal of high side switch 281 is operatively coupled with unboosted voltage source (Vbat).

The gate terminal of high side switch 281 is operatively coupled with a high side switch control signal (INJ_1&2_HS).

The source terminal of high side switch 282 is operatively coupled with injector 1 and injector 2. The drain terminal of high side switch 282 is operatively coupled with a boosted voltage source (Vboost). The gate terminal of high side switch 282 is operatively coupled with a high side boost switch control signal (INJ_1&2_HSB).

The drain terminal of low side switch 283 is operatively coupled with injector 1. The source terminal of low side switch 283 is operatively coupled with current sensor 285. The gate terminal of low side switch 283 is operatively coupled with a low side switch control signal (INJ_1_LS).

Current sensor 285 includes a shunt resistor 287 which is operatively coupled with low side switch 283 and with ground. Current sensor 285 includes a comparator 289 with inputs that are coupled across shunt resistor 287 at respective nodes. The output of current sensor 275 is provided as current sensor signal (INJ_1_CS).

The drain terminal of low side switch 284 is operatively coupled with injector 2. The source terminal of low side switch 284 is operatively coupled with current sensor 286. The gate terminal of low side switch 284 is operatively coupled with a low side switch control signal (INJ_2_LS).

Current sensor 286 includes a shunt resistor 288 which is operatively coupled with low side switch 284 and with ground. Current sensor 286 includes a comparator 290 with inputs that are coupled across shunt resistor 288 at respective nodes. The output of current sensor 286 is provided as current sensor signal (INJ_2_CS).

High side switch 281, high side switch 282, low side switch 283, and low side switch 284 may be controlled by control signal INJ_1&2_HS, boost control signal INJ_1&2_HSB, control signal INJ_1_LS, and control signal INJ_2_LS, respectively, to selectably cause unboosted or boosted current to flow through injector 1 and/or injector 2 effective to actuate injector 1 and/or injector 2. The current flowing through injector 1 may be detected by current sensor 285 and provided as feedback in the form of a current sensor signal (INJ_1_CS). The current flowing through injector 2 may be detected by current sensor 286 and provided as feedback in the form of a current sensor signal (INJ_2_CS).

It shall be appreciated that circuits substantially similar circuit 280 may be provided and utilized in connection with the other banks of boosted injectors. As illustrated in FIG. 6B, circuit 280' may be provided for injector 3 and injector 4 and may include a circuit substantially similar to circuit 280 but with inputs and outputs corresponding to injector 3 and injector 4. Thus, circuit 280' may receive control inputs and provide feedback outputs analogous to those of circuit 280, but configured for control and sensing of injector 3 and injector 4. As illustrated in FIG. 6C, circuit 280's may be provided for injector 5 and injector 6 and may include a circuit substantially similar to circuit 280 but with inputs and outputs corresponding to injector. Thus, circuit 280" may receive control inputs and provide feedback outputs analogous to those of circuit 280, but configured for control and sensing of injector 5 and injector 6.

Figure 5:
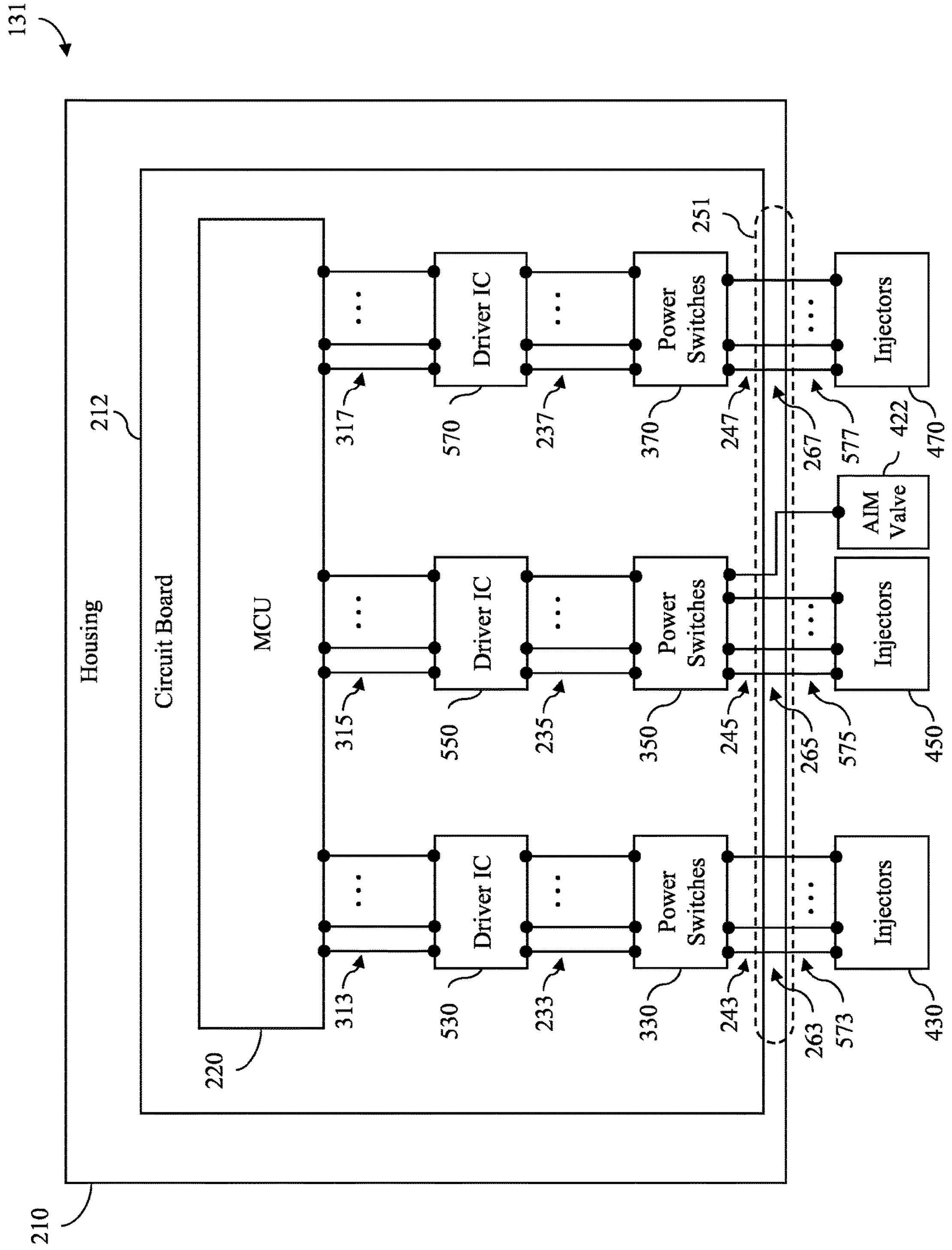
FIG. 5 is a schematic diagram depicting certain aspects of an example fuel injector controller.

With reference to FIG. 5, there is illustrated an example electronic control unit (ECU) 131 which may be provided as a component of ECS 130. In the illustrated example, ECU 131 comprises a housing 210 containing a circuitry board 212 on which are mounted a microcontroller unit (MCU) 220, a plurality of driver integrated circuits (Driver IC) 530, 550, and 570, and a plurality of power switches including power switches 330, power switches 350, and power switches 370. MCU 220 is operatively coupled with Driver IC 530, 550, and 570 by a plurality of conductors which are configured and provide in the form of conductive traces 313, 315, and 317, respectively, in the illustrated embodiment.

Driver IC 530 is operatively coupled with power switches 330 by a plurality of conductors which are configured and provide in the form of conductive traces 233 of circuit board 212 in the illustrated embodiment. Power switches 330 are operatively coupled with pins 263 of ECU interface 251 by a plurality of conductors which are configured and provide in the form of conductive traces 243 of circuit board 212. The plurality of pins 263 of ECU interface 251 are, in turn, operatively coupled with respective conductors of wiring harness conductors 573 which are, in turn, operatively coupled with injectors 430.

Driver IC 550 is operatively coupled with power switches 350 by a plurality of conductors which are configured and provide in the form of conductive traces 235 of circuit board 212 in the illustrated embodiment. Power switches 350 are operatively coupled with pins 265 of ECU interface 251 by a plurality of conductors which are configured and provide in the form of conductive traces 245 of circuit board 212. The plurality of pins 265 of ECU interface 251 are, in turn, operatively coupled with respective conductors of wiring harness conductors 575 which are, in turn, operatively coupled with injectors 450 and AIM valve 422.

Driver IC 570 is operatively coupled with power switches 370 by a plurality of conductors which are configured and provide in the form of conductive traces 237 of circuit board 212 in the illustrated embodiment. Power switches 370 are operatively coupled with pins 267 of ECU interface 251 by a plurality of conductors which are configured and provide in the form of conductive traces 247 of circuit board 212. The plurality of pins 267 of ECU interface 251 are, in turn, operatively coupled with respective conductors 577 of a wiring harness which are, in turn, operatively coupled with injectors 470.

With reference to FIGS. 6A, 6B, and 6C there are illustrated further aspects of the example electronic control unit (ECU) 131 of FIG. 5. It shall be appreciated that ECU 131 may include other aspects, components, and features in additional to and/or as alternatives to those illustrated in FIGS. 6A, 6B, and 6C.

As illustrated in FIG. 6A, MCU 220 includes a communication bus component which is configured and provided in the form of a serial peripheral interface (SPI) 205. Other components of MCU 220, such as a one or more processing cores, one or more non-transitory memory units, and/or other MCU components, may be operatively coupled with SPI 205 as indicated by the illustrated adjacent arrow and ellipsis.

SPI 205 is adapted and configured to provide bi-directional digital communication between MCU 220 as a main device and Driver IC 530 as a subservient device which may include main out sub in (MOSI) communication from MCU 220 to Driver IC 530, and main in sub out (MISO) communication from Driver IC 530 to MCU 220, among other logical signals. It shall be appreciated that other types of communication busses and associated communications and architectures may be utilized in some embodiments. SPI 205 may be configured to utilize two input/output pins of MCU 220 to provide bidirectional MOSI and MISO communication between MCU 220 and Driver IC 530.

SPI 205 may be utilized to communicate information relating to the operation of one or more fuel injectors from driver IC 530 to MCU 220. For example, driver IC 530 may be configured and operable to receive and process analog feedback signals associated with circuit 270 or circuit 280, such as current sensor signal (INJ_1_CS), current sensor signal (INJ_2_CS), and current sensor signal (INJ_7_CS). Driver IC 530 may be configured and operable to determine digital information indicative of one or more of the aforementioned current sensor signals and to communicate such digital information to MCU 220. Such communication may allow MCU 220 to perform closed-loop feedback control of and diagnostics relating the fuel injectors associated with circuit 270 and/or circuit 280.

MCU 220 includes a real-time or near real-time interface component which is configured and provided in the form of timer module (TM) 207. Other components of MCU 220, such as a one or more processing cores, one or more memory units, and/or other components, may be operatively coupled with TM 207 as indicated by the illustrated adjacent arrow and ellipsis. TM 207 is adapted and configured to provide injector phase and injector pulse signals which may be received and utilized by Driver IC 530 to determine control outputs for an injector, for example, as described below in connection with FIG. 7. In the illustrated example, TM 207 outputs to Driver IC 530 a phase signal for injector 1 (INJ_1_Phase), a pulse signal for injector 1 (INJ_1_pulse), a phase signal for injector 2 (INJ_2_Phase), a pulse signal for injector 2 and (INJ_2_pulse), a phase signal for injector 7 (INJ_7_Phase), and a pulse signal for injector 7 (INJ_7_pulse).

MCU 220 may include feedback signal conditioning component which is configured and provided in the form of analog-to-digital converter (A2D) 209 in the illustrated embodiment. Other components of MCU 220, such as a one or more processing cores, one or more memory units, and/or other components, may be operatively coupled with A2D 209 as indicated by the illustrated adjacent arrow and ellipsis.

Driver IC 530 may be configured to communicate analog information indicative of the aforementioned current sensor signals to A2D 209 of MCU 220. For example, driver IC 530 may configured to communicate an analog feedback signal for injector 1 (INJ_1_FB), an analog feedback signal for injector 2 (INJ_2_FB), and an analog feedback signal for injector 7 (INJ_7_FB) which may be the same as, correlated with, or otherwise indicative of current sensor signal (INJ_1_CS), current sensor signal (INJ_2_CS), and current sensor signal (INJ_7_CS), respectively. Driver IC 530 may be configured to pass through or to amplify, attenuate, filter, scale or otherwise process the aforementioned current sensor signals such that the aforementioned feedback signals suitable for and compatible with the input requirements of A2D 209 of MCU 220. Such communication and processing may provide a redundant or failsafe signal path allowing MCU 220 to perform closed-loop feedback control of and diagnostics relating the fuel injectors associated with circuit 270 and/or circuit 280. In embodiments, where such redundancy or failsafe is not implemented, pin connections and communication from driver IC 530 and MCU 220 may be omitted, and A2D 209 of MCU 220 may optionally be dedicated to other signal processing, left unutilized, or omitted altogether.

MCU 220 includes additional input output components (I/O) 202 which may be configured and provided in the form of general purpose microcontroller inputs or outputs. Other components of MCU 220, such as a one or more processing cores, one or more memory units, and/or other components, may be operatively coupled with I/O 202 as indicated by the illustrated adjacent arrow and ellipsis. I/O 202 are adapted and configured to provide communication of a number of input and output signals between MCU 220 and Driver IC 530. In the illustrated example, MCU 220 may provide a reset signal RST, an enable signal (EN) and a clock signal (CLK) to Driver IC 530 via I/O 202, and Driver IC 530 may provide an interrupt request signal (IRQ) to MCU 220 via I/O 202.

Driver IC 530 may determine a high side switch control signal and a low side switch control signal in response to a phase signal for a given injector and a pulse signal for a given injector. Driver IC 530 may make such determinations for each of the high side and low side switch control signals with which it is associated. By way of example, the operation of Driver IC 530 will now be further described with respect to a particular injector, it being appreciated that the principles so described may be applied to other injectors and other Driver ICs disclosed herein.

Figure 7:
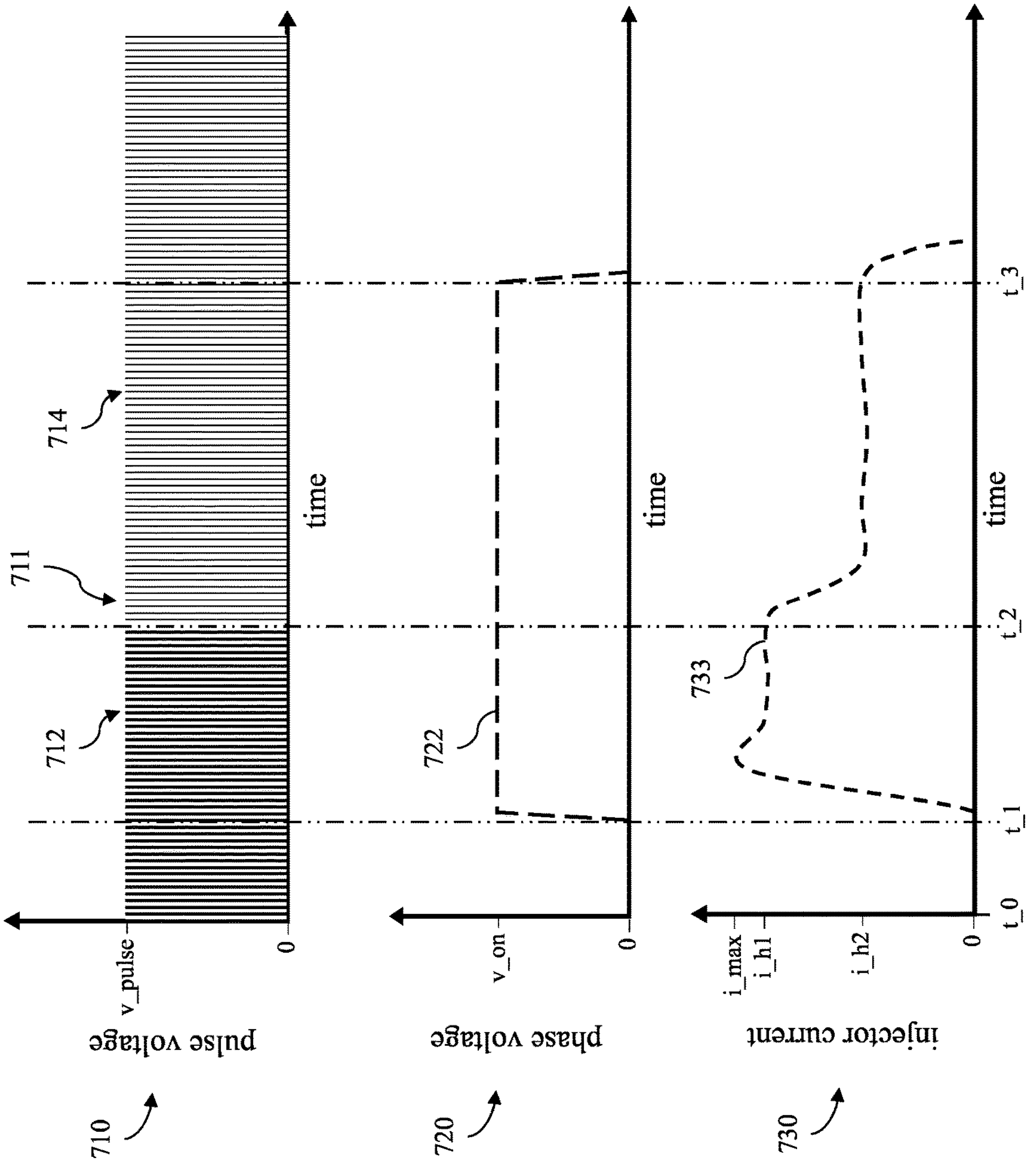
FIG. 7 is a set of graphs depicting certain aspects of an example controls.

FIG. 7 depicts certain aspects of an example determination that may be performed by Driver IC 530 relative to injector 7. Graph 710 illustrates a pulse voltage signal 711 as a function of time which corresponds to the pulse signal for injector 7 (INJ_7_pulse). Graph 720 illustrates a phase voltage signal 722 as a function of time which corresponds to the phase signal for injector 7 (INJ_7_Phase). Graph 730 illustrates an injector current signal 733 as a function of time which corresponds to the current sensor signal (INJ_7_CS). Driver IC 530 may determine commands effective to actuate injector 7 in the manner indicated by injector current signal 733 by multiplying pulse voltage signal 711 and phase voltage signal 722. From time t_0 to time t_1 phase voltage signal 722 is zero and the product of phase voltage signal 722 pulse voltage signal is zero, resulting in an injector current signal 733 equal to zero.

At time t_1 phase voltage signal 722 transitions from zero to a non-zero value (v_on) and the product of phase voltage signal 722 and pulse voltage signal 711 causes injector current signal 733 to rise to a maximum overshoot current value (i_max) (due to the operation of the inductive load of the injector and the opening force of a solenoid armature of the injector) and then to stabilize at a first injector-on current (i_h1) whose magnitude is a function of a maximum duty cycle 712 of pulse voltage signal 711 and phase voltage signal 722. Driver IC 530 may determine and set the high side switch control signal (INJ_7_HS) to an on value for a first high side predetermined duration and may determine and set the low side switch control signal (INJ_7_LS) to an on value for a first low side predetermined duration to provide the illustrated injector operation.

At time t_2 phase voltage signal remains at non-zero value (v_on), pulse voltage signal 711 transitions to a lower magnitude duty cycle 714, and the product of phase voltage signal 722 and pulse voltage signal 711 causes injector current signal 733 to fall to and stabilize at a second injector-on current (i_h1) whose magnitude is a function of a lower magnitude duty cycle 714 of pulse voltage signal 711 and phase voltage signal 722. Driver IC 530 may determine and set the high side switch control signal (INJ_7_HS) to an on value for a second high side predetermined duration which may be less than the first high side predetermined duration, and may determine and set the low side switch control signal (INJ_7_LS) to an on value for a second low side predetermined duration to provide the illustrated injector operation.

At time t_3 phase voltage signal transitions to zero, and the product of phase voltage signal 722 and pulse voltage signal 711 falls to zero which causes injector current signal 733 to fall to zero.

It shall be appreciated that the example of FIG. 7 is but one of several modulation and control signal determination techniques that may be utilized by Driver IC 530 to may determine switch control signals effective to actuate an injector in response to phase and pulse signals. For example, various embodiments may utilize delta modulation, delta-sigma modulation, space vector modulation, time proportioning, or other control techniques in connection with the control illustrated and described herein. The related control operations may be distributed among MCU 220 and one or more Driver IC 530 or substantially provided in one or the other thereof.

It shall be further appreciated that such techniques may be applied by Driver IC 530 to control operation of multiple high side switched to select between closing high side switched to selectably provide non-boosted voltages or boosted voltages, for example, in response to variation in the pulse voltage signal and/or variation in the phase voltage signal. In connection with such operation Driver IC 530 may also provide boost voltage signal (Vboost) to boost supply 293 which may be utilized to provide boosted voltage source (Vboost). Thus, for example, Driver IC 530 may utilize one or more of the foregoing techniques or operations to determine control signal INJ_1&2_HS, boost control signal INJ_1&2_HSB, control signal INJ_1_LS, and control signal INJ_2_LS, in response to the pulse signal for injector 1 (INJ_1_pulse), the phase signal for injector 1 (INJ_1_Phase), the pulse signal for injector 2 (INJ_2_pulse), and the phase signal for injector 2 (INJ_2_Phase).

As illustrated in FIG. 6B, SPI 205 may be adapted and configured to provide bi-directional digital communication between MCU 220 and Driver IC 550 in a manner substantially similar to that described above in connection with FIG. 6A. I/O 202 may also be adapted and configured to provide communication of a number of input and output signals between MCU 220 and Driver IC 550 in a manner substantially similar to that described above in connection with FIG. 6A. It shall be appreciated certain pins of MCU 220 may be reused or shared among multiple devices, for example, clock signal (CLK) may be provided from a single pin to multiple Driver ICs. In other examples, device addressing or multiplexing techniques may be utilize for reuse or sharing of MCU pins. SPI 205 may be configured to utilize two input/output pins of MCU 220 to provide bidirectional MOSI and MISO communication between MCU 220 and Driver IC 550.

SPI 205 may be utilized to communicate information relating to the operation of one or more fuel injectors from driver IC 550 to MCU 220. For example, driver IC 550 may be configured and operable to receive and process analog feedback signals associated with circuit 270', circuit 270", circuit 270''', or circuit 280', such as current sensor signal (INJ_3_CS), current sensor signal (INJ_4_CS), current sensor signal (INJ_8_CS), current sensor signal (INJ_10_CS), current sensor signal (INJ_AIM_CS). Driver IC 550 may be configured and operable to determine digital information indicative of one or more of the aforementioned current sensor signals and to communicate such digital information to MCU 220. Such communication may allow MCU 220 to perform closed-loop feedback control of and diagnostics relating the fuel injectors associated with associated with circuit 270', circuit 270", and/or circuit 280'. Such communication may allow MCU 220 to perform closed-loop feedback control of and diagnostics relating the AIM valve associated with circuit 270'''.

TM 207 may provide to Driver IC 550, a phase signal for injector 3 (INJ_3_Phase), a pulse signal for injector 3

(INJ_3_pulse), a phase signal for injector 4 (INJ_4_Phase), a pulse signal for injector 4 (INJ_4_pulse), a phase signal for injector 8 (INJ_8_Phase), a pulse signal for injector 8 (INJ_8_pulse), a phase signal for injector 10 (INJ_10_Phase), a pulse signal for injector 10 (INJ_10_pulse), and a phase signal for an active inlet metering (AIM) valve (AIM_Phase), a pulse signal for AIM valve (AIM_pulse). Driver IC 550 may, in turn process the received signals to determine control signals using substantially similar techniques and operations as those described in connection with Driver IC 530. It shall be appreciated that the AIM valve may be provided and configured to control fuel flow into a fuel pump which may be provided, for example, in fueling system 118 or another fueling system.

Driver IC 550 may determine control signal INJ_3&4_HS, boost control signal INJ_3&4_HSB, control signal INJ_3_LS, and control signal INJ_4_LS, in response to the pulse signal for injector 3 (INJ_3_pulse), the phase signal for injector 3 (INJ_3_Phase), the pulse signal for injector 4 (INJ_4_pulse), and the phase signal for injector 4 (INJ_4_Phase).

Driver IC 550 may determine control signal INJ_8_HS, and control signal INJ_8_LS, in response to the pulse signal for injector 8 (INJ_8_pulse), and the phase signal for injector 8 (INJ_8_Phase). Driver IC 550 may determine control signal INJ_10_HS, and control signal INJ_10_LS, in response to the pulse signal for injector 10 (INJ_10_pulse), and the phase signal for injector 10 (INJ_10_Phase). Driver IC 550 may determine control signal AIM_HS, and control signal AIM_LS, in response to the pulse signal for AIM valve (AIM_Pulse), and the phase signal for AIM valve (AIM_Phase).

Driver IC 550 may be configured to communicate analog information indicative of the aforementioned current sensor signals to A2D 209 of MCU 220. For example, driver IC 550 may configured to communicate an analog feedback signal for injector 3 (INJ_3_FB), an analog feedback signal for injector 4 (INJ_4_FB), an analog feedback signal for injector 8 (INJ_8_FB), an analog feedback signal for injector 10 (INJ_10_FB), and an analog feedback signal for the AIM valve (AIM_FB) which may be the same as, correlated with, or otherwise indicative of current sensor signal (INJ_3_CS), current sensor signal (INJ_4_CS), current sensor signal (INJ_8_CS), current sensor signal (INJ_10_CS), and current sensor signal (INJ_AIM_CS), respectively. Driver IC 550 may be configured to pass through or to amplify, attenuate, filter, scale or otherwise process the aforementioned current sensor signals such that the aforementioned feedback signals suitable for and compatible with the input requirements of A2D 209 of MCU 220. Driver IC 570 may be configured to pass through or to amplify, attenuate, filter, scale or otherwise process the aforementioned current sensor signals such that the aforementioned feedback signals suitable for and compatible with the input requirements of A2D 209 of MCU 220. Such communication and processing may provide a redundant or failsafe signal path allowing MCU 220 to perform closed-loop feedback control of and diagnostics relating the fuel injectors associated with circuit 270 and/or circuit 280. In embodiments, where such redundancy or failsafe is not implemented, pin connections and communication from driver IC 530 and MCU 220 may be omitted, and A2D 209 of MCU 220 may optionally be dedicated to other signal processing, left unutilized, or omitted altogether.

As illustrated in FIG. 6C, SPI 205 may be adapted and configured to provide bi-directional digital communication between MCU 220 and Driver IC 570 in a manner substantially similar to that described above in connection with FIG. 6A. I/O 202 may also be adapted and configured to provide communication of a number of input and output signals between MCU 220 and Driver IC 570 in a manner substantially similar to that described above in connection with FIG. 6A. It shall be appreciated certain pins of MCU 220 may be reused or shared among multiple devices, for example, clock signal (CLK) may be provided from a single pin to multiple Driver ICs. In other examples, device addressing or multiplexing techniques may be utilize for reuse or sharing of MCU pins. SPI 205 may be configured to utilize two input/output pins of MCU 220 to provide bidirectional MOSI and MISO communication between MCU 220 and Driver IC 570.

SPI 205 may be utilized to communicate information relating to the operation of one or more fuel injectors from driver IC 570 to MCU 220. For example, driver IC 570 may be configured and operable to receive and process analog feedback signals associated with circuit 270"", circuit 270""", circuit 270"""", or circuit 280", such as current sensor signal (INJ_5_CS), current sensor signal (INJ_6_CS), current sensor signal (INJ_9_CS), current sensor signal (INJ_11_CS), and current sensor signal (INJ_12_CS). Driver IC 570 may be configured and operable to determine digital information indicative of one or more of the aforementioned current sensor signals and to communicate such digital information to MCU 220. Such communication may allow MCU 220 to perform closed-loop feedback control of and diagnostics relating the fuel injectors associated with circuit 270"", circuit 270""", circuit 270"""", and/or circuit 280".

TM 207 may provide to Driver IC 570, a phase signal for injector 5 (INJ_5_Phase), a pulse signal for injector 5 (INJ_5_pulse), a phase signal for injector 6 (INJ_6_Phase), a pulse signal for injector 6 (INJ_6_pulse), a phase signal for injector 9 (INJ_9_Phase), a pulse signal for injector 9 (INJ_9_pulse), a phase signal for injector 11 (INJ_11_Phase), a pulse signal for injector 11 (INJ_11_pulse), a phase signal for injector 12 (INJ_12_Phase), and a pulse signal for injector 12 (INJ_12_pulse). Driver IC 570 may, in turn process the received signals to determine control signals using substantially similar techniques and operations as those described in connection with Driver IC 530.

Driver IC 570 may determine control signal INJ_5&6_HS, boost control signal INJ_5&6_HSB, control signal INJ_5_LS, and control signal INJ_6_LS, in response to the pulse signal for injector 3 (INJ_5_pulse), the phase signal for injector 3 (INJ_5_Phase), the pulse signal for injector 4 (INJ_6_pulse), and the phase signal for injector 4 (INJ_6_Phase).

Driver IC 570 may determine control signal INJ_9_HS, and control signal INJ_9_LS, in response to the pulse signal for injector 9 (INJ_9_pulse), and the phase signal for injector 9 (INJ_9_Phase). Driver IC 570 may determine control signal INJ_11_HS, and control signal INJ_11_LS, in response to the pulse signal for injector 11 (INJ_11_pulse), and the phase signal for injector 11 (INJ_11_Phase). Driver IC 570 may determine control signal INJ_12_HS, and control signal INJ_12_LS, in response to the pulse signal for injector 12 (INJ_12_pulse), and the phase signal for injector 12 (INJ_12_Phase).

Driver IC 570 may be configured to communicate analog information indicative of the aforementioned current sensor signals to A2D 209 of MCU 220. For example, driver IC 570 may configured to communicate an analog feedback signal for injector 5 (INJ_5_FB), an analog feedback signal for injector 6 (INJ_6_FB), an analog feedback signal for injector 9 (INJ_9_FB), an analog feedback signal for injector 11 (INJ_11_FB), and an analog feedback signal for injector 12 (INJ_12_FB) which may be the same as, correlated with, or otherwise indicative of current sensor signal (INJ_5_CS), current sensor signal (INJ_6_CS), current sensor signal (INJ_9_CS), current sensor signal (INJ_11_CS), and current sensor signal (INJ_12_CS), respectively. Such communication and processing may provide a redundant or failsafe signal path allowing MCU 220 to perform closed-loop feedback control of and diagnostics relating the fuel injectors associated with circuit 270 and/or circuit 280. In embodiments, where such redundancy or failsafe is not implemented, pin connections and communication from driver IC 530 and MCU 220 may be omitted, and A2D 209 of MCU 220 may optionally be dedicated to other signal processing, left unutilized, or omitted altogether.

A2D 209 may receive from Driver IC 570 an analog signal indicative of injector current. In the illustrated example, Driver IC 570 outputs to A2D 209 of MCU 220 an analog feedback signal for injector 5 (INJ_5_FB), an analog feedback signal for injector 6 (INJ_6_FB), an analog feedback signal for injector 9 (INJ_9_FB), an analog feedback signal for injector 11 (INJ_11_FB), and an analog feedback signal for injector 12 (INJ_12_FB).

As illustrated in FIGS. 6A-6C, as few as thirty-one (31) input/output pins of MCU 220 may be utilized by driver IC 530, driver IC 550, and driver IC 570, for driving the fuel injectors of the circuits associated therewith. In particular, twenty-one (21) pins of MCU 220 may be utilized in providing the aforementioned pulse signals and phase signals utilized in controlling the aforementioned fuel injectors, six (6) pins of MCU 220 may be utilized by SPI 205, and one (1) input of MCU 220 may be utilized for the aforementioned reset, enable, interrupt, and clock signals. Thus, the disclosed circuitry may provide a microcontroller pin-to-fuel injector ratio less than eight to three (8:3).

In some embodiment, as few as two (2) additional input/output pins of MCU 220 may be utilized by driver IC 550 for driving the AIM valve associated therewith for a total of thirty-three (33) input/output pins. Thus, the disclosed circuitry may provide a microcontroller pin-to-fuel injector and AIM valve ratio less than seventeen to six (17:6).

In some embodiments, as few as eight (8) additional input/output pins of MCU 220 may be utilized by driver IC 530, driver IC 550, and driver IC 570 to provide the aforementioned feedback signals to A2D 209 of MCU 220 for a total of thirty-three (41) input/output pins. Thus, the disclosed circuitry may provide a microcontroller pin-to-fuel injector ratio inclusive of redundant feedback of less than ten to three (10:3), or may provide a microcontroller pin-to-fuel injector and AIM valve ratio inclusive of redundant feedback of less than twenty-one to six (21:6).

As shown by this detailed description, the present disclosure contemplates multiple and various embodiments, including, without limitation, the following example embodiments. A first example embodiment is an apparatus comprising: a microcontroller; first injector driver circuitry comprising a first integrated circuit operatively coupled with and controllable by the microcontroller and a first plurality of switching devices operatively coupled with and controllable by the first integrated circuit; second injector driver circuitry comprising a second integrated circuit operatively coupled with and controllable by the microcontroller and a second plurality of switching devices operatively coupled with and controllable by the second integrated circuit; third injector driver circuitry comprising a third integrated circuit operatively coupled with and controllable by the microcontroller and a third plurality of switching devices operatively coupled with and controllable by the third integrated circuit; and a housing containing the microcontroller, the first injector driver circuitry, the second injector driver circuitry, and the third injector driver circuitry; wherein the first injector driver circuitry, the second injector driver circuitry, and the third injector driver circuitry are each configured to drive a different number of fuel injectors.

A second example embodiment includes the features of the first example embodiment, wherein the first injector driver circuitry is configured to drive three fuel injectors, the second injector driver circuitry is configured to drive four fuel injectors, and the third injector driver circuitry is configured to drive five fuel injectors.

A third example embodiment includes the features of the first example embodiment, wherein each of the first plurality of switching devices, the second plurality of switching devices, and the third plurality of switching devices comprises a respective set of switches configured to drive a respective bank of multiple boosted injectors.

A fourth example embodiment includes the features of the third example embodiment, wherein each of the first plurality of switching devices, the second plurality of switching devices, and the third plurality of switching devices comprises a respective second sets of switches each configured to drive a single unboosted injector.

A fifth example embodiment includes the features of the fourth example embodiment, wherein the number of switches in the second sets of switches varies among the first plurality of switching devices, the second plurality of switching devices, and the third plurality of switching devices.

A sixth example embodiment includes the features of the first example embodiment, comprising a first plurality of fuel injectors operatively coupled with and controllable by the first injector driver circuitry, a second plurality of fuel injectors operatively coupled with and controllable by the second injector driver circuitry, and a third plurality of fuel injectors operatively coupled with and controllable by the second injector driver circuitry.

A seventh example embodiment includes the features of the first example embodiment, wherein the microcontroller, the first injector driver circuitry, the second injector driver circuitry, and the third injector driver circuitry, are coupled with a common circuit board.

An eighth example embodiment includes the features of the first example embodiment, wherein the first injector driver circuitry is configured to drive a boosted voltage supply.

A ninth example embodiment includes the features of the first example embodiment, wherein the second injector driver circuitry is configured to drive an active inlet metering valve operatively coupled with a fuel pump.

A tenth example embodiment includes the features of the first example embodiment, wherein the first injector driver circuitry, the second injector driver circuitry, and the third injector driver circuitry, utilize any one or more of (a) not more than 31 microcontroller input/output (i/o) pins to drive 12 fuel injectors, (b) not more than 33 microcontroller input/output (i/o) pins to drive 12 fuel injectors and an actively controlled fuel pump inlet metering valve, (c) not more than 39 microcontroller input/output (i/o) pins to drive 12 fuel injectors with redundant analog signal feedback of injector current sensor information provided to the microcontroller, and (d) not more than 41 microcontroller input/output (i/o) pins to drive 12 fuel injectors with redundant analog signal feedback of injector current sensor information provided to the microcontroller and an actively controlled fuel pump inlet metering valve.

An eleventh example embodiment is a comprising: providing a housing containing a microcontroller, first injector driver circuitry comprising a first integrated circuit operatively coupled with the microcontroller and a first plurality of switching devices operatively coupled with the first integrated circuit, second injector driver circuitry comprising a second integrated circuit operatively coupled with the microcontroller and a second plurality of switching devices operatively coupled with the second integrated circuit, and third injector driver circuitry comprising a third integrated circuit operatively coupled with the microcontroller and a third plurality of switching devices operatively coupled with the third integrated circuit; operating the first injector driver circuitry to drive a first number of fuel injectors; operating the second injector driver circuitry to drive a second number of fuel injectors differing from the first number of fuel injectors; and operating the third injector driver circuitry to drive a third number of fuel injectors differing from the first number of fuel injectors and the second number of fuel injectors.

A twelfth example embodiment includes the features of the eleventh example embodiment, wherein the first number of fuel injectors comprises three fuel injectors, the second number of fuel injectors comprises four fuel injectors, and the third number of fuel injectors comprises five fuel injectors.

A thirteenth example embodiment includes the features of the twelfth example embodiment, wherein a total number of the first number of fuel injectors, the second number of fuel injectors, and the third number of fuel injectors is twelve fuel injectors.

A fourteenth example embodiment includes the features of the twelfth example embodiment, wherein each of the first number of fuel injectors, the second number of fuel injectors, and the third number of fuel injectors comprises a respective set of switches configured to drive a respective bank of multiple boosted injectors.

A fifteenth example embodiment includes the features of the fourteenth example embodiment, wherein each of the first number of fuel injectors, the second number of fuel injectors, and the third number of fuel injectors comprises a respective second sets of switches each configured to drive a single unboosted injector.

A sixteenth example embodiment is a system comprising: an electronic control unit containing a microcontroller and injector driver circuitry, the injector driver circuitry comprising a first integrated circuit operatively coupled with and controllable by the microcontroller, a first plurality of switching devices operatively coupled with and controllable by the first driver integrated circuit, a second integrated circuit operatively coupled with and controllable by the microcontroller, a second plurality of switching devices operatively coupled with and controllable by the second driver integrated circuit, and a third integrated circuit operatively coupled with and controllable by the microcontroller, and a third plurality of switching devices operatively coupled with and controllable by the third driver integrated circuit; a first plurality of fuel injectors operatively coupled with and controllable by the first integrated circuit and the a first plurality of switching devices; a second plurality of fuel injectors operatively coupled with and controllable by the second integrated circuit and the a second plurality of switching devices; and a third plurality of fuel injectors operatively coupled with and controllable by the third integrated circuit and the a third plurality of switching devices; wherein the first plurality of fuel injectors, the second plurality of fuel injectors, and the third plurality of fuel injectors each comprise a different number of fuel injectors.

A seventeenth example embodiment includes the features of the sixteenth example embodiment, wherein the first plurality of fuel injectors consists of three fuel injectors, the second plurality consists of four fuel injectors, and the third plurality of fuel injectors consists of five fuel injectors.

An eighteenth example embodiment includes the features of the eighteenth example embodiment, wherein each of the first plurality of fuel injectors, the second plurality of fuel injectors, and the third plurality of fuel injectors comprises a bank of multiple boosted injectors.

An nineteenth example embodiment includes the features of the eighteenth example embodiment, wherein each of the first plurality of fuel injectors, the second plurality of fuel injectors, and the third plurality of fuel injectors comprises a different number of single unboosted injectors.

A twentieth example embodiment includes the features of the nineteenth example embodiment, wherein the first plurality of fuel injectors comprises one single unboosted injector, the second plurality of fuel injectors comprises two single unboosted injectors, and the third plurality of fuel injectors comprises three single unboosted injectors single unboosted injectors.

It shall be appreciated that terms such as "a non-transitory memory," "a non-transitory memory medium," and "a non-transitory memory device" refer to a number of types of devices and storage mediums which may be configured to store information, such as data or instructions, readable or executable by a processor or other components of a computer system and that such terms include and encompass a single or unitary device or medium storing such information, multiple devices or media across or among which respective portions of such information are stored, and multiple devices or media across or among which multiple copies of such information are stored.

It shall be appreciated that terms such as "determine," "determined," "determining" and the like when utilized in connection with a control method or process, an electronic control system or controller, electronic controls, or components or operations of the foregoing refer inclusively to a number of acts, configurations, devices, operations, and techniques including, without limitation, calculation or computation of a parameter or value, obtaining a parameter or value from a lookup table or using a lookup operation, receiving parameters or values from a datalink or network communication, receiving an electronic signal (e.g., a voltage, frequency, current, or pulse-width modulation (PWM) signal) indicative of the parameter or value, receiving output of a sensor indicative of the parameter or value, receiving other outputs or inputs indicative of the parameter or value, reading the parameter or value from a memory location on a computer-readable medium, receiving the parameter or value as a run-time parameter, and/or by receiving a parameter or value by which the interpreted parameter can be calculated, and/or by referencing a default value that is interpreted to be the parameter value.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus comprising:

a microcontroller;

first injector driver circuitry comprising a first integrated circuit operatively coupled with and controllable by the microcontroller and a first plurality of switching devices operatively coupled with and controllable by the first integrated circuit;

second injector driver circuitry comprising a second integrated circuit operatively coupled with and controllable by the microcontroller and a second plurality of switching devices operatively coupled with and controllable by the second integrated circuit;

third injector driver circuitry comprising a third integrated circuit operatively coupled with and controllable by the microcontroller and a third plurality of switching devices operatively coupled with and controllable by the third integrated circuit; and a housing containing the microcontroller, the first injector driver circuitry, the second injector driver circuitry, and the third injector driver circuitry;

wherein the first injector driver circuitry, the second injector driver circuitry, and the third injector driver circuitry are each configured to drive a different number of fuel injectors.

2. The apparatus of claim 1, wherein the first injector driver circuitry is configured to drive three fuel injectors, the second injector driver circuitry is configured to drive four fuel injectors, and the third injector driver circuitry is configured to drive five fuel injectors.

3. The apparatus of claim 1, wherein each of the first plurality of switching devices, the second plurality of switching devices, and the third plurality of switching devices comprises a respective set of switches configured to drive a respective bank of multiple boosted injectors.

4. The apparatus of claim 3, wherein each of the first plurality of switching devices, the second plurality of switching devices, and the third plurality of switching devices comprises a respective second sets of switches each configured to drive a single unboosted injector.

5. The apparatus of claim 4, wherein the number of switches in the second sets of switches varies among the first plurality of switching devices, the second plurality of switching devices, and the third plurality of switching devices.

6. The apparatus of claim 1, comprising a first plurality of fuel injectors operatively coupled with and controllable by the first injector driver circuitry, a second plurality of fuel injectors operatively coupled with and controllable by the second injector driver circuitry, and a third plurality of fuel injectors operatively coupled with and controllable by the second injector driver circuitry.

7. The apparatus of claim 1, wherein the microcontroller, the first injector driver circuitry, the second injector driver circuitry, and the third injector driver circuitry, are coupled with a common circuit board.

8. The apparatus of claim 1, wherein the first injector driver circuitry is configured to drive a boosted voltage supply.

9. The apparatus of claim 1, wherein the second injector driver circuitry is configured to drive an active inlet metering valve operatively coupled with a fuel pump.

10. The apparatus of claim 1, wherein the first injector driver circuitry, the second injector driver circuitry, and the third injector driver circuitry, utilize not more than 31 microcontroller input/output (i/o) pins to drive 12 fuel injectors.

11. A process comprising:

providing a housing containing a microcontroller, first injector driver circuitry comprising a first integrated circuit operatively coupled with the microcontroller and a first plurality of switching devices operatively coupled with the first integrated circuit, second injector driver circuitry comprising a second integrated circuit operatively coupled with the microcontroller and a second plurality of switching devices operatively coupled with the second integrated circuit, and third injector driver circuitry comprising a third integrated circuit operatively coupled with the microcontroller and a third plurality of switching devices operatively coupled with the third integrated circuit;

operating the first injector driver circuitry to drive a first number of fuel injectors;

operating the second injector driver circuitry to drive a second number of fuel injectors differing from the first number of fuel injectors; and operating the third injector driver circuitry to drive a third number of fuel injectors differing from the first number of fuel injectors and the second number of fuel injectors.

12. The process of claim 11, wherein the first number of fuel injectors comprises three fuel injectors, the second number of fuel injectors comprises four fuel injectors, and the third number of fuel injectors comprises five fuel injectors.

13. The process of claim 12, wherein a total number of the first number of fuel injectors, the second number of fuel injectors, and the third number of fuel injectors is twelve fuel injectors.

14. The process of claim 12, wherein each of the first number of fuel injectors, the second number of fuel injectors, and the third number of fuel injectors comprises a respective set of switches configured to drive a respective bank of multiple boosted injectors.

15. The process of claim 14, wherein each of the first number of fuel injectors, the second number of fuel injectors, and the third number of fuel injectors comprises a respective second sets of switches each configured to drive a single unboosted injector.

16. A system comprising:

an electronic control unit containing a microcontroller and injector driver circuitry, the injector driver circuitry comprising a first integrated circuit operatively coupled with and controllable by the microcontroller, a first plurality of switching devices operatively coupled with and controllable by the first driver integrated circuit, a second integrated circuit operatively coupled with and controllable by the microcontroller, a second plurality of switching devices operatively coupled with and controllable by the second driver integrated circuit, and a third integrated circuit operatively coupled with and controllable by the microcontroller, and a third plurality of switching devices operatively coupled with and controllable by the third driver integrated circuit;

a first plurality of fuel injectors operatively coupled with and controllable by the first integrated circuit and the a first plurality of switching devices;

a second plurality of fuel injectors operatively coupled with and controllable by the second integrated circuit and the a second plurality of switching devices; and a third plurality of fuel injectors operatively coupled with and controllable by the third integrated circuit and the a third plurality of switching devices;

wherein the first plurality of fuel injectors, the second plurality of fuel injectors, and the third plurality of fuel injectors each comprise a different number of fuel injectors.

17. The system of claim 16, wherein the first plurality of fuel injectors consists of three fuel injectors, the second plurality consists of four fuel injectors, and the third plurality of fuel injectors consists of five fuel injectors.

18. The system of claim 16, wherein each of the first plurality of fuel injectors, the second plurality of fuel injectors, and the third plurality of fuel injectors comprises a bank of multiple boosted injectors.

19. The system of claim 18, wherein each of the first plurality of fuel injectors, the second plurality of fuel injectors, and the third plurality of fuel injectors comprises a different number of single unboosted injectors.

20. The system of claim 19, wherein the first plurality of fuel injectors comprises one single unboosted injector, the second plurality of fuel injectors comprises two single unboosted injectors, and the third plurality of fuel injectors comprises three single unboosted injectors single unboosted injectors.

* * * * *